(12) United States Patent
Iizuka

(10) Patent No.: US 8,553,251 B2
(45) Date of Patent: Oct. 8, 2013

(54) INFORMATION PROCESSING APPARATUS AND PRINT CONTROL METHOD

(75) Inventor: Hiroko Iizuka, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 1302 days.

(21) Appl. No.: 11/539,056

(22) Filed: Oct. 5, 2006

(65) Prior Publication Data

US 2007/0091360 A1 Apr. 26, 2007

(30) Foreign Application Priority Data

Oct. 26, 2005 (JP) .................................. 2005-310794

(51) Int. Cl.
*G06F 3/12* (2006.01)
*G06F 15/00* (2006.01)
*G06K 1/00* (2006.01)

(52) U.S. Cl.
USPC .......................... 358/1.15; 358/1.13; 358/1.9

(58) Field of Classification Search
USPC ........................ 358/1.15, 1.9, 1.13
See application file for complete search history.

(56) References Cited

U.S. PATENT DOCUMENTS

| | | | | |
|---|---|---|---|---|
| 5,959,530 A * | 9/1999 | Lupien et al. | ............... | 340/568.1 |
| 6,348,971 B2 * | 2/2002 | Owa et al. | .................... | 358/1.15 |
| 6,552,813 B2 * | 4/2003 | Yacoub | ........................... | 358/1.1 |
| 6,883,981 B2 * | 4/2005 | Kizaki et al. | .................... | 400/76 |
| 6,965,958 B1 * | 11/2005 | Sugiyama | ..................... | 710/104 |
| 7,426,046 B2 * | 9/2008 | Shirai et al. | .................. | 358/1.13 |
| 2002/0181013 A1 * | 12/2002 | Dunlap | ......................... | 358/1.15 |
| 2003/0002069 A1 * | 1/2003 | Bhogal et al. | ................ | 358/1.15 |
| 2003/0117640 A1 * | 6/2003 | Parry et al. | .................... | 358/1.14 |
| 2005/0254070 A1 * | 11/2005 | Sayama | ......................... | 358/1.1 |
| 2006/0001899 A1 * | 1/2006 | Kanno | ........................... | 358/1.14 |
| 2006/0044607 A1 * | 3/2006 | Kato | ........................... | 358/1.15 |

FOREIGN PATENT DOCUMENTS

| | | | |
|---|---|---|---|
| JP | 05-143253 | A | 6/1993 |
| JP | 2002-370425 | A | 12/2002 |
| JP | 2003-333224 | A | 11/2003 |
| JP | 2004-152261 | A | 5/2004 |
| JP | 2004-287822 | A | 10/2004 |

\* cited by examiner

*Primary Examiner* — Ming Hon
(74) *Attorney, Agent, or Firm* — Canon USA Inc. IP Division

(57) ABSTRACT

An information processing apparatus determines whether data to be printed has an attribute indicating that printing is required to be performed according to a printing function in which data received from an external device is printed after a user input is received via an operation unit of the printing device. When the data to be printed has the attribute indicating that printing is required to be performed according to the printing function, the information processing apparatus controls the printing device that is capable of performing the printing function so that the data to be printed is printed according to the printing function.

15 Claims, 13 Drawing Sheets

| | |
|---|---|
| 1501 | COMMAND LENGTH |
| 1502 | USER IDENTIFIER |
| 1503 | REQUEST IDENTIFIER |
| 1504 | DOCUMENT IDENTIFIER |

| DOCUMENT IDENTIFIER (1601) | RESERVATION PRINTING DESIGNATION (1602) |
|---|---|
| 00103 | DESIGNATED |
| 01002 | NOT DESIGNATED |
| 0A245 | DESIGNATED |
| AVDFR | NOT DESIGNATED |

INFORMATION PROCESSING APPARATUS AND PRINT CONTROL METHOD

BACKGROUND OF THE INVENTION

1. Field of the Invention

The present invention relates to an information processing apparatus that is capable of communicating with a printing device and performs control so that printing is performed according to a given printing method (e.g., reservation printing method) by the printing device and to a print control method for performing control so that printing is performed according to a given printing method by a printing device.

2. Description of the Related Art

In recent years, an access authorization control server (access control system) that is capable of setting various access control for a file per each user is marketed. By using the access authorization control server, a person who produces a file can perform control of access to a distributed file independently and differently for each user. The access control refers to control such as control of browsing a file, setting of an effective period to a file, restriction on copying of a file, restriction on printing of a file, and restriction on changing of a file, for example.

In addition, Japanese Patent Application Laid-Open No. 2003-333224 discusses an image forming apparatus in which security data (including a password, print medium information, and specific operator information), which has a function for suspending a printing operation when a specific condition is satisfied or a function for not starting a printing operation unless a specific condition is satisfied at the time of inputting an original, is added to document data. The security data is used to restrict a total number of prints to make of a document to the number of copies that a producer of the document desires.

In the access control system as described above or the image forming apparatus discussed in Japanese Patent Application Laid-Open No. 2003-333224, a setting as to presence or absence of permission for printing can be set to each file that each user accesses. However, even if a printing person prints highly confidential data based on an effective authorization, there is a possibility that the printing person forgets to pick up a print product (that is, there is a possibility that another person carries away the print product by mistake). Accordingly, the above conventional technique cannot avoid an information leakage occurring due to the printing person forgetting to pick up the print product or another person carrying away the print product before the printing person has an opportunity to pick up the print product.

SUMMARY OF THE INVENTION

At least one embodiment of the present invention is directed to a method for preventing or at least mitigating an information leakage occurring when a printing person of a document forgets to pick up a print product or when another person carries away the print product by mistake.

According to an aspect of the present invention, an information processing apparatus that is capable of communicating with a printing device that is capable of performing a printing function in which printing of data received from an external device is performed after a user input is received via an operation unit of the printing device. The information processing apparatus includes: a determination unit configured to determine whether data to be printed has an attribute indicating that printing is required to be performed according to the printing function; and a control unit configured to, if it is determined by the determination unit that the data to be printed has the attribute indicating that printing is required to be performed according to the printing function, control the printing device that is capable of performing the printing function so that the data to be printed is printed according to the printing function.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 15 is a diagram that illustrates an example of a command that is sent from a client device to an access authorization control server according to the second embodiment.

FIG. 16 is a diagram that illustrates an example of a file access authorization management table according to the second embodiment.

DETAILED DESCRIPTION OF THE EMBODIMENTS

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
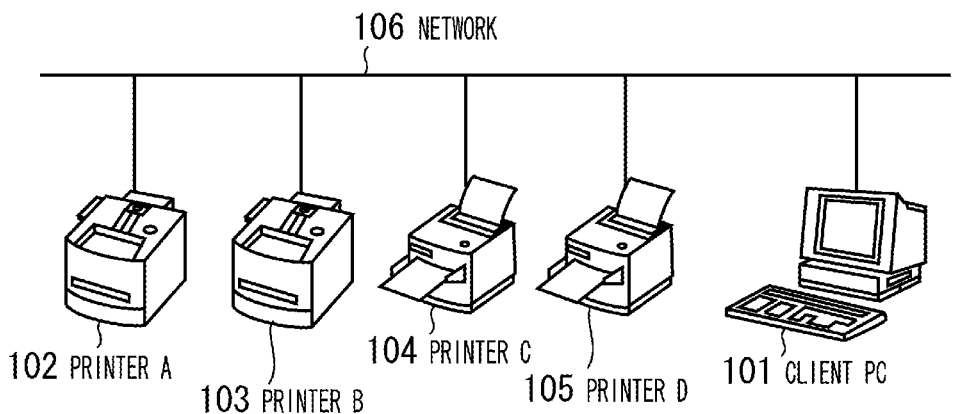
FIG. 1 is a diagram that illustrates an example of a system configuration of a system to which an information processing apparatus according to a first embodiment of the present invention can be applied.

FIG. 1 is a diagram that illustrates an example of a system configuration of a system to which an information processing apparatus according to a first embodiment of the present invention can be applied.

Referring to FIG. 1, a client device (PC) 101 is connected to a plurality of printing devices (printers 102 through 105) via a network 106. Note that in the present invention, a method for mutually connecting the client device 101 and the printing devices 102 through 105 is not limited to a specific method.

In addition, note that the printer A 102 and the printer C 104 are reservation printing-compliant printers to be described later below. In addition, the printer B 103 and the printer D 105 are reservation printing-noncompliant printers.

Here, reservation printing refers to a printing method in which print information received by a printer is retained without immediately performing printing using the print information and the print information is printed out only when a printing person instructs the printing via an operation unit of the printer. Note that in this case, the printer requests the printing person to enter a user ID, a password that is set differently for each user, and a password that is set differently for each print information, so as to prohibit printing of print information authorized to another person.

By performing the reservation printing, the printing person instructs the printing in front of the printer. Thus, an occurrence of a situation in which another person looking at a print product before the printing person picks up a print product can be prevented. Additionally, an occurrence of a situation in which the printing person forgetting to pick up a print product and leaving the print product untaken can be prevented. Furthermore, an occurrence of a situation in which another person carrying away a print product by mistake can be prevented so as to prevent an information leakage from occurring.

Figure 2:
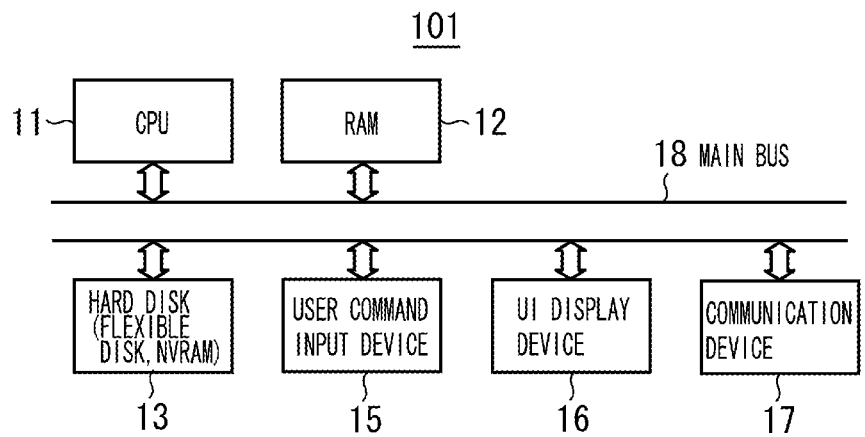
FIG. 2 is a block diagram that illustrates an example of a configuration of a client device shown in FIG. 1.

FIG. 2 is a block diagram that illustrates an example of a configuration of the client device 101 shown in FIG. 1.

Referring to FIG. 2, a CPU 11 controls the client device 101. A RAM 12 provides a work area for the CPU 11. A hard disk (or an NVRAM or a flexible disk) 13 provides a program that can be executed by the CPU 11 and stores various settings. A user command input device 15 includes a keyboard and a pointing device, and is used when a user (including an operator and an installing person) inputs a command. A UI display device 16 includes a display that displays a user interface (UI) on a screen. A communication device 17 is a device that performs a communication with the printing devices. A main bus 18 interconnects various components of the client device 101.

In the client device 101, the CPU 11 controls the RAM 12, the hard disk 13, the user command input device 15, the UI display device 16, and the communication device 17 via the main bus 18.

Figure 3:
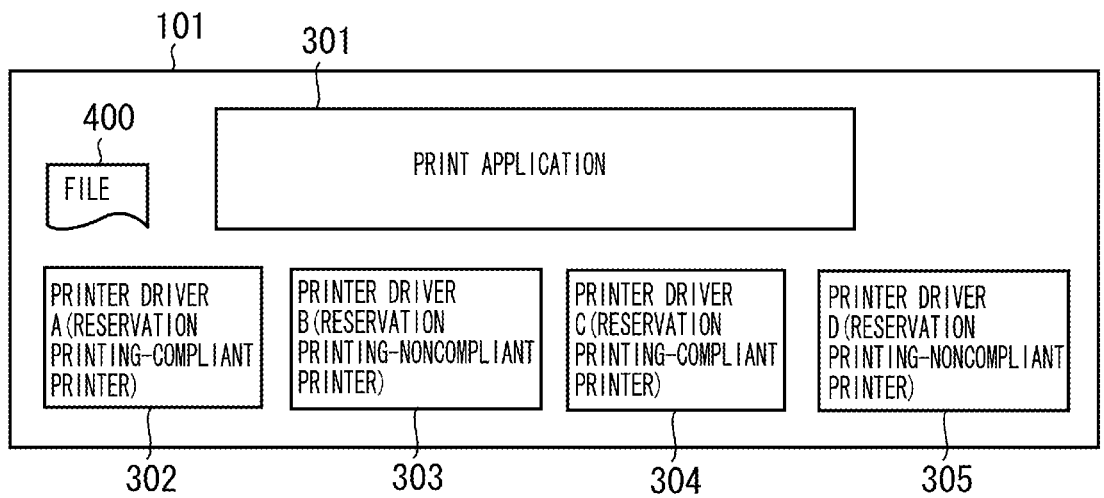
FIG. 3 is a diagram that illustrates an example of a software configuration of the client device shown in FIG. 2.

FIG. 3 is a diagram that illustrates an example of a software configuration of the client device 101 shown in FIG. 2.

Referring to FIG. 3, a print application 301 accesses a file 400 to be printed and also performs an information exchange with printer drivers 302 through 305 that respectively correspond to each of the printing devices.

Note that the printer driver A 302 is a printer driver for the printer A 102 that is compliant to the reservation printing. In addition, the printer driver B 303 is a printer driver for the printer B 103 that is not compliant to the reservation printing. In addition, the printer driver C 304 is a printer driver for the printer C 104 that is compliant to the reservation printing. In addition, the printer driver D 305 is a printer driver for the printer D 105 that is not compliant to the reservation printing.

Note that the print application 301 and the printer drivers 302 through 305 are implemented in a manner such that the CPU 11 reads a program stored in the hard disk 13 to the RAM 12 so as to execute the program. In addition, the file 400 is stored in the hard disk 13.

Figure 4:
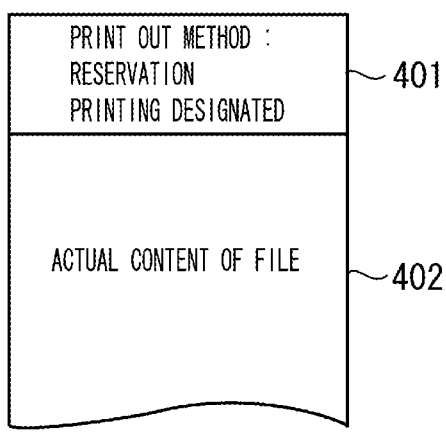
FIG. 4 is a diagram that illustrates an example of an inner configuration of a file according to the first embodiment.

FIG. 4 is a diagram that illustrates an example of an inner configuration of the file 400 according to the present embodiment. As shown in FIG. 4, a producer of the file, at the time of production of the file 400, previously embeds information 401 that indicates a printing method that is permitted for the file into the file, in a format shown in FIG. 4. Note that reference numeral 402 denotes an actual content of the file.

Figure 5:
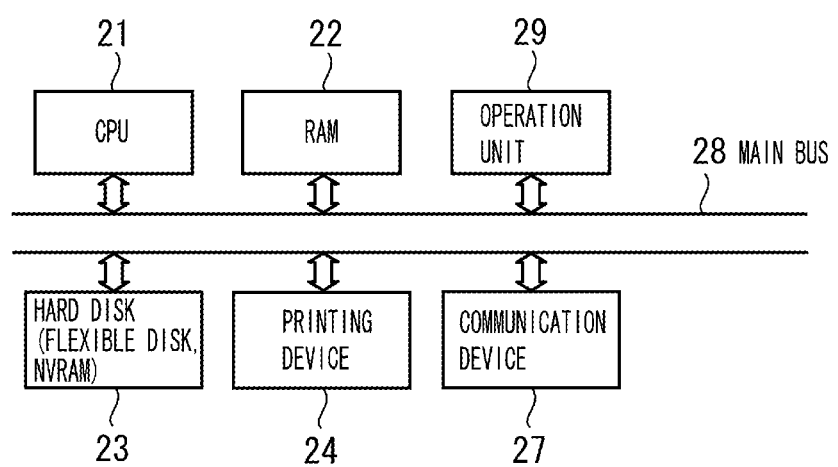
FIG. 5 is a block diagram that illustrates an example of an inner configuration of a printing device (printer) shown in FIG. 1.

FIG. 5 is a block diagram that illustrates an example of an inner configuration of the printing devices (the printers 102 through 105) shown in FIG. 1.

Referring to FIG. 5, a CPU 21 controls the printing device. A RAM 22 provides a work area for the CPU 21. A hard disk (or an NVRAM or a flexible disk) 23 provides a program that can be executed by the CPU 21 and stores various settings. A printing device (printer engine) 24 performs printing onto printing paper. A communication device 27 is a device that performs a communication with the client device 101 via the network 106. A main bus 28 interconnects various components of the printing device.

An operation unit 29 includes a display unit, a touch panel, and hard keys, and is capable of displaying a message, performing various settings for the printing device, and inputting a print instruction for the reservation printing.

In the printing device, the CPU 21 controls the RAM 22, the hard disk 23, the printing device 24, the communication device 27, and the operation unit 29 via the main bus 28.

An operation performed when the printer driver is installed on the client device according to the first embodiment is described below in detail with reference to FIG. 6.

Figure 6:
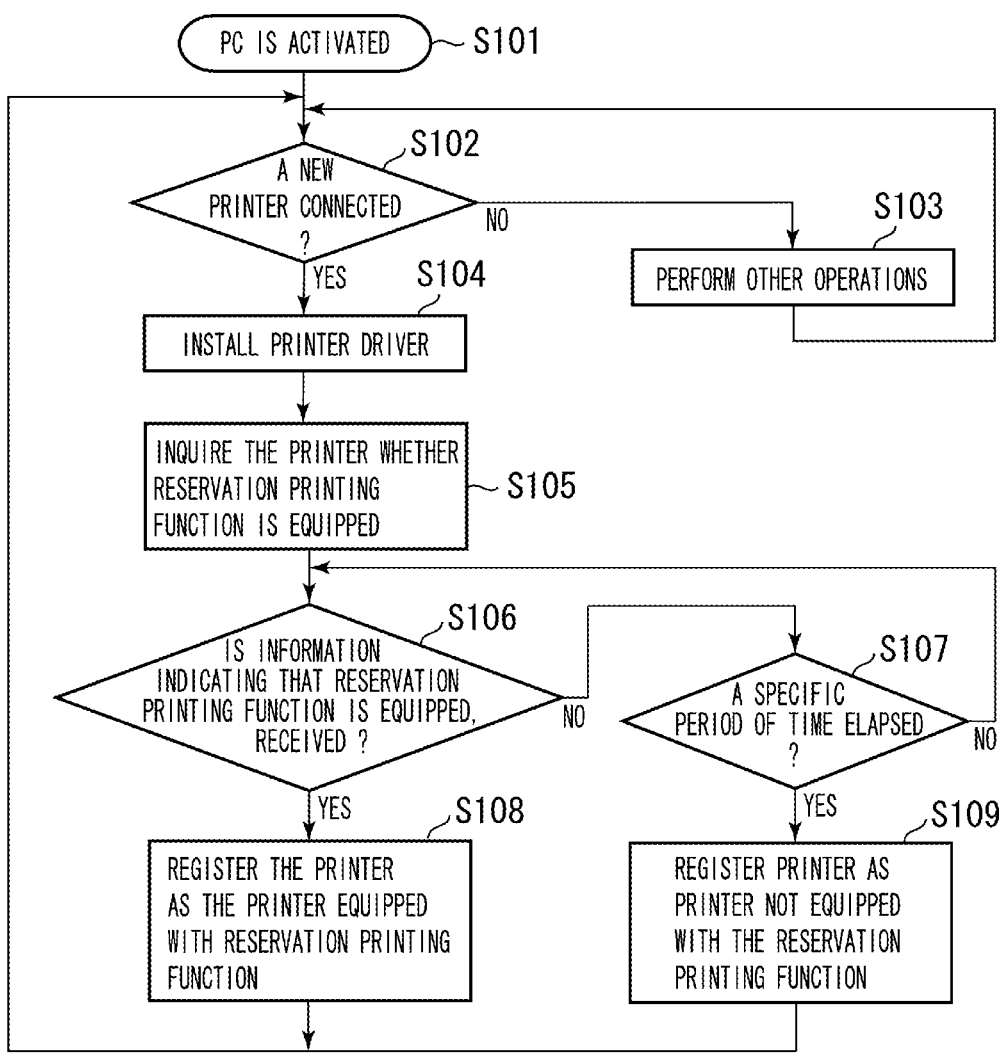
FIG. 6 is a flow chart that illustrates an example of a first procedure for control processing according to the first embodiment.

FIG. 6 is a flow chart that illustrates an example of a first procedure for control processing according to the first embodiment. The steps of the flow chart shown in FIG. 6 correspond to processing for installing the printer driver to the client device 101 shown in FIG. 1. Note that, in an embodiment, the processing shown in this flow chart is implemented in a manner such that the CPU 11 of the client device 101 reads a program stored in the hard disk 13 to the RAM 12 so as to execute the program.

First, the client device 101 is activated in step S101, and then the CPU 11 of the client device 101 advances the processing to step S102. In step S102, the CPU 11 determines whether a new printer is connected. Note that any suitable method for determining whether a new printer is connected can be used.

In step S102, if it is determined that no new printer is connected, the CPU 11 performs other operations in step S103, and then the processing returns to step S102.

On the other hand, if it is determined that a new printer is connected in step S102, the CPU 11 installs the printer driver that corresponds to the newly connected printer in step S104. Note that any suitable method for installing the printer driver can be used.

Then, in step S105, the CPU 11 issues an inquiry to the newly connected printer as to whether the newly connected printer is equipped with a reservation printing function (sends inquiry information) and waits until a result of the inquiry is returned and received from the newly connected printer.

Then, in step S106, the CPU 11 determines whether information indicating that the newly connected printer is equipped with the reservation printing function is received. If it is determined that the information indicating that the newly connected printer is equipped with the reservation printing function is received by the CPU 11, the processing advances to step S108. Then, in step S108, the CPU 11 registers the newly connected printer as a reservation printing-compliant printer, and then the processing ends. On the other hand, if it is determined that the information indicating that the newly connected printer is equipped with the reservation printing function is not received by the CPU 11, the processing advances to step S107. Then, is step S107, the CPU 11 determines whether a specific period of time is elapsed since the issuance of the inquiry.

If it is determined that the information indicating that the newly connected printer is equipped with the reservation printing function is not received even after the specific time is elapsed, the processing advances to step S109. Then, in step S109, the CPU 11 registers the newly connected printer as the reservation printing-noncompliant printer, and the processing ends.

Note that registration information that indicates that the newly connected printer is a reservation printing-compliant printer or registration information that indicates that the newly connected printer is a reservation printing-noncompliant printer can be stored in the form of a table in the hard disk 13 of the client device 101. In addition, the registration information can be stored in a storage area (in Windows (registered trademark) of Microsoft Corporation, a DEVMODE structure) for setting information for the printer driver. That is, as long as whether the printer is compliant or noncompliant to the reservation printing can be determined, the registration can be performed in any applicable manner.

Note that in the above flow chart, the description is made as to a configuration such that the client device 101 communicates with the printer so as to issue the inquiry to the printer as to whether the printer is equipped with the reservation printing function. However, the configuration can be arranged such that the user inputs and registers the information that indicates the presence or absence of the reservation printing function via the user command input device 15 with respect to a printer whose printer driver is installed to the client device 101.

An operation for file printing processing (an operation of the print application 301 that performs control as to whether printing is performed or not according to a reservation printing method for printing the file 400 on the client device 101) according to the first embodiment is described below with reference to FIGS. 7 through 11.

Figure 7:
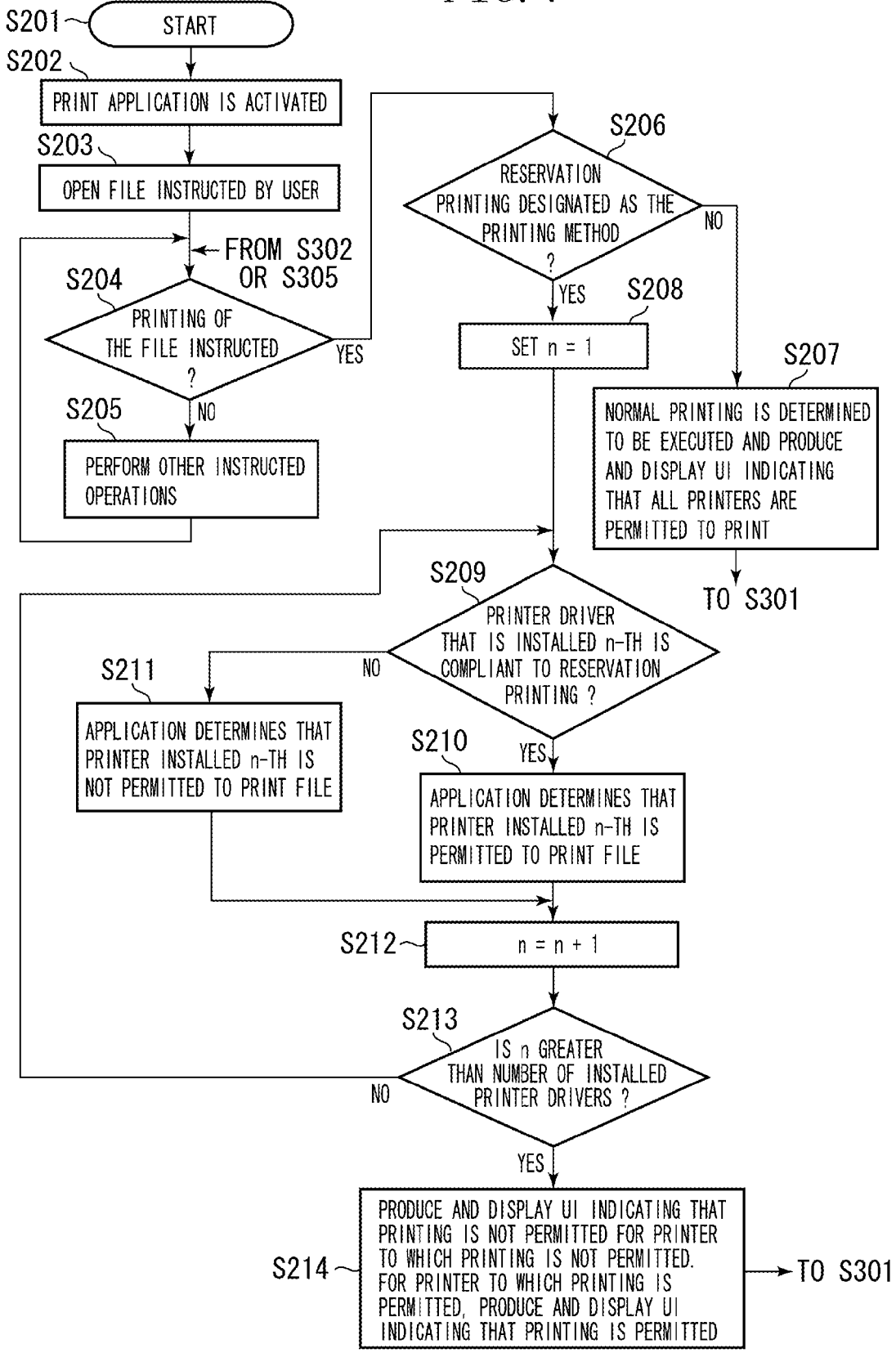
FIG. 7 is a flow chart that illustrates an example of a second procedure for control processing according to the first embodiment.
Figure 8:
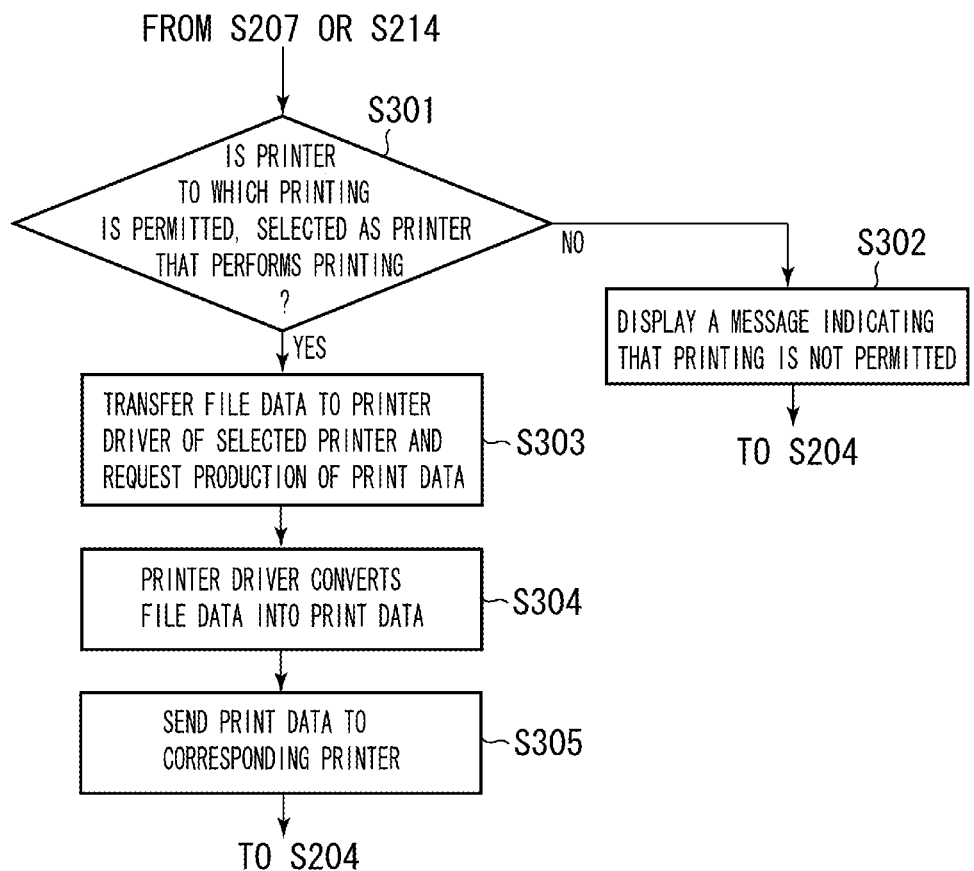
FIG. 8 is a flow chart that illustrates an example of the second procedure for control processing according to the first embodiment.

FIG. 7 and FIG. 8 are flow charts that illustrate an example of a second procedure for control processing according to the first embodiment, and correspond to an operation of print processing by the client device 101 shown in FIG. 1. Note that, in an embodiment, the processing shown in the flow charts is the processing by the print application 301 of the client device 101, and is implemented in a manner such that the CPU 11 of the client device 101 reads a program stored in the hard disk 13 to the RAM 12 so as to execute the program.

When an instruction for activating the print application 301 is input via the user command input device 15, the processing in the flow chart starts in step S201.

In step S202, the CPU 11 activates the print application 301. After that, the print application 301 that is executed by the CPU 11 stays resident on the RAM 12 so as to monitor a print instruction for a file.

When an instruction for opening the file is issued via the user command input device 15, then in step S203, the print application 301 opens the instructed file.

Then, in step S204, the print application 301 determines whether printing of the opened file is instructed via the user command input device 15. Then, if it is determined that the input instruction is an instruction other than the instruction for printing, the processing advances to step S205. Then, in step S205, the print application 301 causes the instructed operation to be executed, and then the processing returns to step S204.

On the other hand, in step S204, if it is determined that printing of the opened file is instructed via the user command input device 15, the print application 301 advances the processing to step S206. In step S206, the print application 301 determines whether the reservation printing method is designated to the opened file that is an object of the print instruction. The processing of the determination can be performed by referring to the information 401 that is present in the file and indicates the printing method. That is, when the information 401 that is present in the file and indicates the printing method includes the information indicating the reservation printing method, the print application 301 determines that the reservation printing method is designated. On the other hand, if the information indicating the reservation printing method is not stored in the information 401 that is present in the file and indicates the printing method or when the information 401 itself that indicates the reservation printing method is not present in the file, the print application 301 determines that the reservation printing method is not designated.

Then, in step S206, if the print application 301 determines that the reservation printing method is not designated for the opened file that is an object of the print instruction, the print application 301 advances the processing to step S207. Then, in step S207, the print application 301 determines that the opened file that is an object of the print instruction should be printed out according to a normal printing method. Then, the print application 301 produces a UI (to be described later with reference to FIG. 10) that indicates that all the printers (the printers 102 through 105 shown in FIG. 1) connected to the client device 101 are permitted to perform printing and performs control so that the produced UI is displayed by the UI display device 16. Then, the processing advances to step S301 in FIG. 8.

On the other hand, in step S206, if the print application 301 determines that the reservation printing method is designated for the opened file that is an object of the print instruction, the processing advances to step S208. Then, in step S208, the print application 301 sets "1" to a variable n that is stored on the RAM 12. The variable n is a counter for counting the number of the printer drivers.

Then, in step S209, the print application 301 checks if the printer corresponding to the printer driver that is installed n-this compliant to the reservation printing. Then, if the print application 301 determines that the printer corresponding to the printer driver that is installed n-th is compliant to the reservation printing, the print application 301 advances the processing to step S210.

Then in step S210, the print application 301 determines that the printer corresponding to the printer driver that is installed n-th is permitted to perform printing and then stores a content to that effect on the RAM 12. Then, the processing advances to step S212.

On the other hand, in step S209, if the print application 301 determines that the printer corresponding to the printer driver that is installed n-th is not compliant to the reservation printing, the print application 301 advances the processing to step S211.

Then, in step S211, the print application 301 determines that the printer corresponding to the printer driver that is installed n-th is not permitted to perform printing and then stores a content to that effect on the RAM 12. Then, the processing advances to step S212.

Then, in step S212, the print application 301 increments the variable n that is a counter for the printer drivers, which is stored on the RAM 12, by 1. Then, the processing advances to step S213.

Then, in step S213, the print application 301 compares the variable n with the number of the installed printer drivers. By the comparison, the print application 301 determines whether the determination in step S209 has been performed with respect to all the printer drivers. Then, if it is determined that the printer driver to be determined still remains (that is, when n≤the number of the installed printer drivers), the print application 301 returns the processing to step S209 and makes the determination with respect to the next printer driver.

On the other hand, in step S213, if the print application 301 determines that no printer to be determined remains (that is, n>the number of installed printer drivers), the print application 301 advances the processing to step S214.

Figure 9:
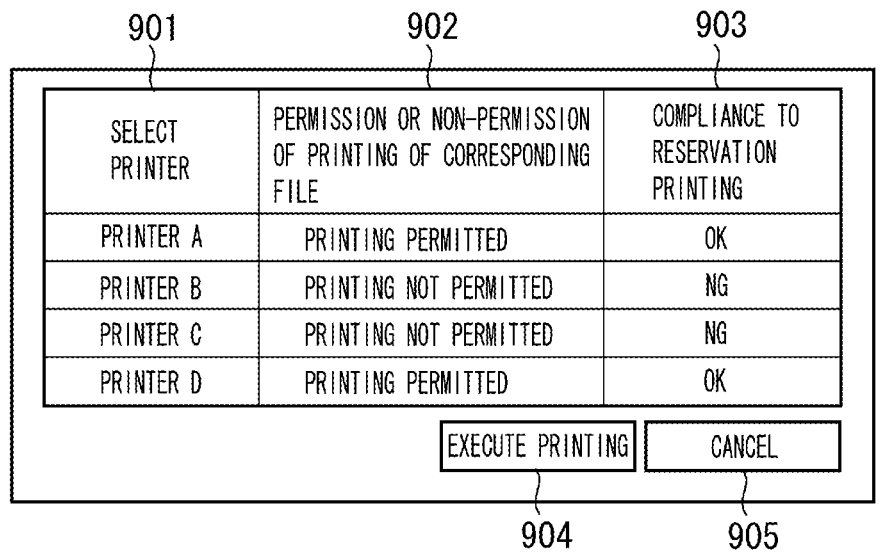
FIG. 9 is a diagram that illustrates an example of a user interface (UI) that is displayed by a UI display device in step S214 shown in FIG. 7.

In step S214, the print application 301 produces a UI indicating that printing is not permitted for the printer that is determined that printing is not permitted, and for the printer that is determined that printing is permitted, produces a UI indicating that printing is permitted (as shown in FIG. 9 to be referred to later below). Then, the print application 301 performs control so that the UI is displayed by the UI display device 16, and then advances the processing to step S301 in FIG. 8.

FIG. 9 is a diagram that illustrates an example of a UI that is displayed by the UI display device 16 in step S214 shown in FIG. 7.

In the UI, with respect to each printer that corresponds to each of the printer drivers that are installed to the client device 101, each of information 901 through 903 is displayed. More specifically, for each printer, each of the information such as a printer name 901, information 902 that indicates presence of permission for printing of a file that is instructed to be printed, and information 903 that indicates compliance/noncompliance to the reservation printing is displayed. Note that the print application 301 performs control so that any one of the printer names displayed in the printer names 901 can be selected via the user command input device 15.

When the user presses a print execution button 904 via the user command input device 15, the user can instruct the execution of printing. When the user presses a cancel button 905 via the user command input device 15, the user can instruct the cancellation of execution of printing.

Figure 10:
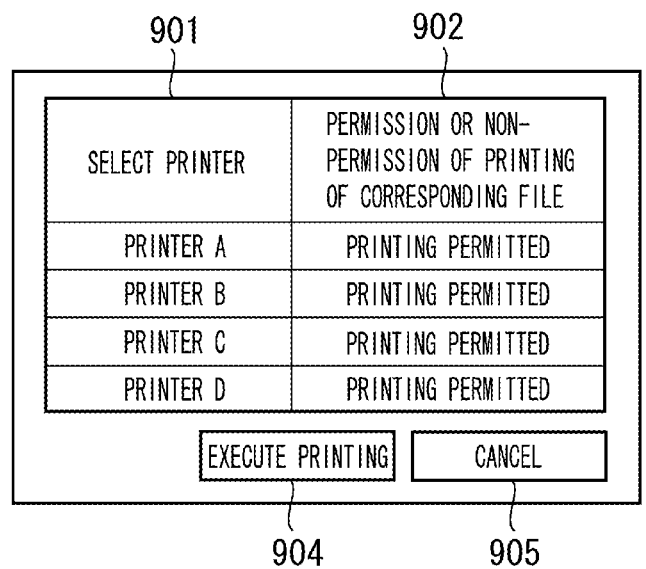
FIG. 10 is a diagram that illustrates an example of a UI indicating that all the printers are permitted for printing, which is displayed in step S207 in FIG. 7.

FIG. 10 is a diagram that illustrates an example of a UI indicating that all the printers are permitted for printing, which is displayed in step S207 in FIG. 7. In FIG. 10, similar components as those shown in FIG. 9 are denoted by the same reference numerals.

Note that the UI shown in FIG. 10 is displayed when the reservation printing is not designated as the method for printing out, and accordingly, the information 903 that indicates the compliance/noncompliance to the reservation printing shown in FIG. 9 is not displayed.

The flow chart shown in FIG. 8 is described below.

When the printer that performs printing is selected and the printing execution button 904 is pressed via the UI shown in FIG. 9 or FIG. 10 using the user command input device 15, the print application 301 advances the processing to step S301.

Figure 11:
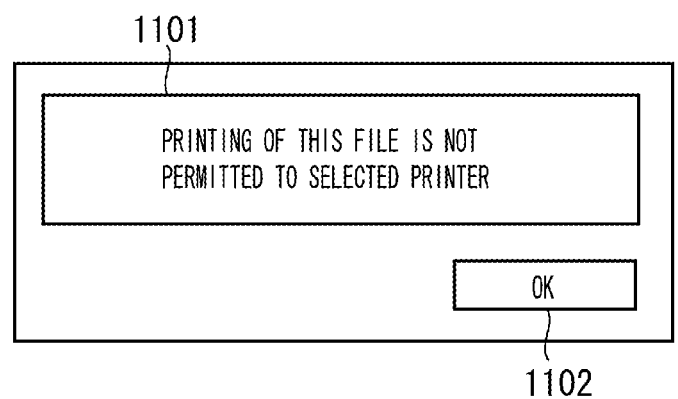
FIG. 11 is a diagram that illustrates an example of a message indicating that printing is not permitted, which is displayed in step S302 in FIG. 8.

In step S301, the print application 301 checks if the printer that is permitted to perform printing is selected. If it is determined that the printer that is not permitted to perform printing (that is, printing-nonpermitted printer) is selected, the print application 301 advances the processing to step S302. In step S302, the print application 301 displays a message indicating that printing is not permitted (a message 1101 as shown in FIG. 11) on the UI display device 16. Then, when an "OK" button 1102 is pressed via the user command input device 15, the processing returns to step S204 in FIG. 7.

FIG. 11 is a diagram that illustrates an example of the message indicating that printing is not permitted, which is displayed in step S302 in FIG. 8.

On the other hand, in step S301, if the print application 301 determines that the printer that is permitted for printing is selected as the printer that performs printing, the print application 301 shifts the processing to step S303.

Then, in step S303, the print application 301 transfers data of the file that is instructed to be printed to the printer driver that corresponds to the selected printer so as to request print data to be produced.

Then, in step S304, the printer driver (executed by the CPU 11) that is requested to produce the print data converts the data of the file that is instructed to be printed into the print data that the printer corresponding to the printer deriver can rasterize into an image. Then, in step S305, the printer driver sends the converted print data to the corresponding printer via the communication device 17. Note that in this case, print setting information including the designation for the reservation printing is sent as well. Then, the processing returns to step S204.

As described above, the client device 101, when receiving a request for printing data to be printed, reads attribute information that is added to the data to be printed. Then, the client device 101 performs control so that if the data to be printed is set as outputable only by the reservation printing, the reservation printing is automatically performed by the printer compliant to the reservation printing. With this configuration, an information leakage occurring when a printing person forgets to pick up a print product or when another person carries away a print product by mistake in printing highly confidential data can be suppressed.

Second Embodiment

In the first embodiment, a description has been made as to a configuration such that attribute information that is added to data to be printed is read from the data to be printed. In a second embodiment of the present invention, attribute information that indicates the attribute of data to be printed is acquired from a server at the time of receiving by the client device of a request for printing the data to be printed.

Figure 12:
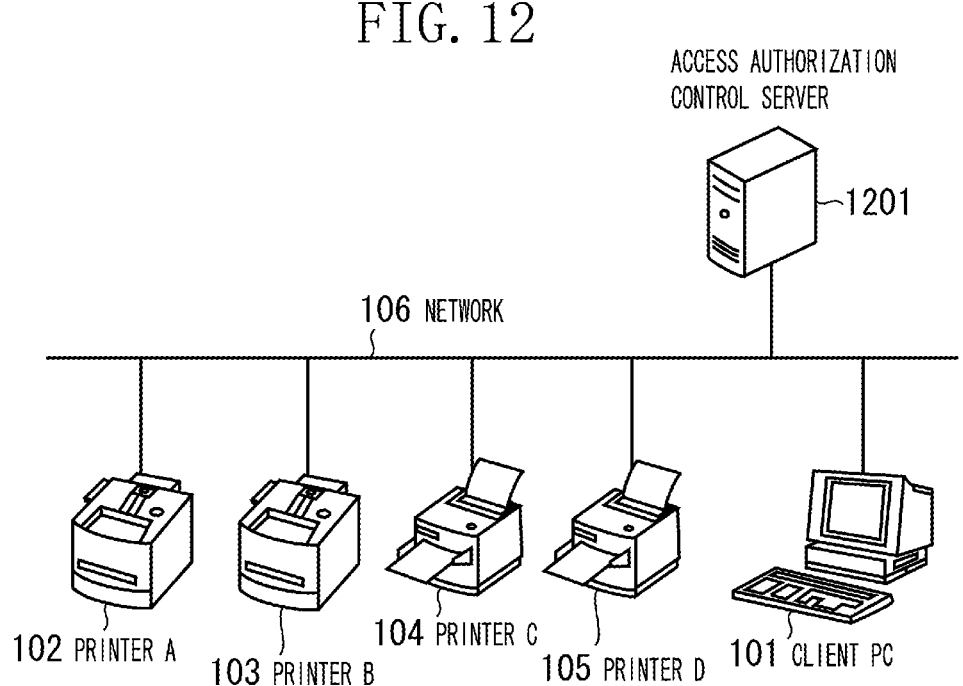
FIG. 12 is a diagram that illustrates an example of a system configuration of a system to which an information processing apparatus according to a second embodiment of the present invention can be applied.

FIG. 12 is a diagram that illustrates an example of a system configuration of a system to which an information processing apparatus according to the second embodiment of the present invention can be applied. In FIG. 12, similar components as those in FIG. 1 are denoted by the same reference numerals.

Referring to FIG. 12, an access authorization control server 1201 is connected to the client device 101 and a plurality of printing devices (the printers 102 through 105) via the network 106. Note that in the present embodiment, the method for mutually connecting the client device 101, the printing devices 102 through 105, and the access authorization control server 1201 is not limited to a specific method.

Note that the hardware configuration of the access authorization control server 1201 is similar to the hardware configuration of the client device 101.

Figure 13:
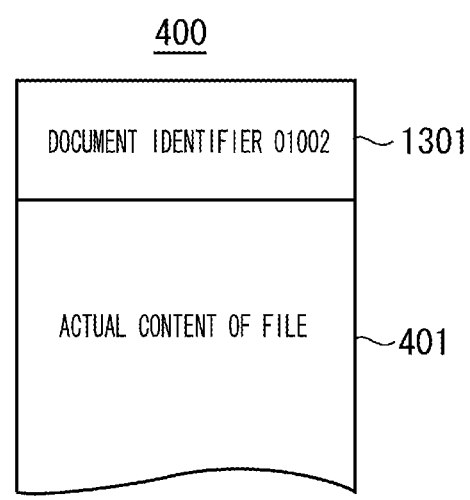
FIG. 13 is a diagram that illustrates an example of an inner configuration of a file that is used in the second embodiment.

FIG. 13 is a diagram that illustrates an example of an inner configuration of a file that is used in the present embodiment. In FIG. 13, similar components as those shown in FIG. 4 are denoted by the same reference numerals.

In the present embodiment, as shown in FIG. 13, a producer of a file previously embeds in the file a document identifier 1301 that is capable of uniquely identifying a file at the time of production of the file, in a format shown in FIG. 13.

An operation of the access authorization control server 1201 in the second embodiment is described below with reference to FIG. 14.

Figure 14:
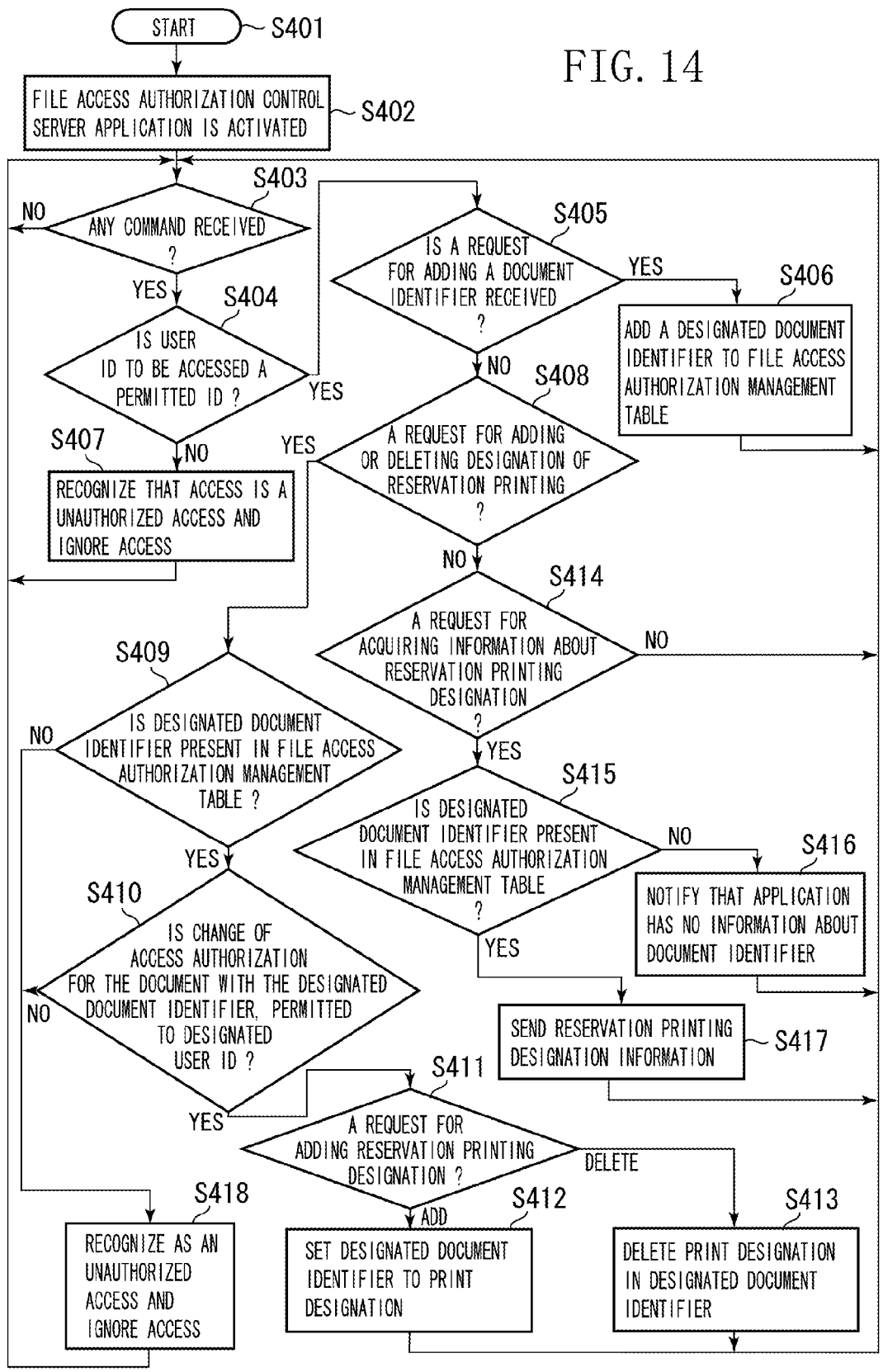
FIG. 14 is a flow chart that illustrates an example of a third procedure for control processing according to the second embodiment.

FIG. 14 is a flow chart that illustrates an example of a third procedure for control processing according to the second embodiment, and corresponds to the operation of the access authorization control server 1201 shown in FIG. 12. Note that the processing of this flow chart is implemented in a manner such that a CPU of the access authorization control server 1201 reads a program stored in a hard disk to a RAM so as to execute the program.

First, when the access authorization control server 1201 is activated in step S401, then, in step S402, the CPU of the access authorization control server 1201 activates a file access authorization control server application on the access authorization control server 1201.

Then, in step S403, the file access authorization control sever application waits until a command 1500 having a format shown in FIG. 15 is received from the client device 101.

FIG. 15 is a diagram that illustrates an example of the command 1500 that is sent from the client device 101 to the access authorization control server 1201 according to the second embodiment.

As shown in FIG. 15, the command 1500 that is sent from the client device 101 to the access authorization control server 1201 includes information 1501 through 1504.

A command length 1501 corresponds to information that indicates the length of a command. A user identifier 1502 corresponds to an identifier for identifying an access user. A request identifier 1503 corresponds to a identifier that indicates a "document identifier adding request", a "reservation printing designation adding request", a "reservation printing designation deleting request", or a printing-permitted printer information acquiring request". A document identifier 1504 corresponds to an identifier that identifies a document to be operated.

Note that the client device 101 is capable of transferring a command to the access authorization control server 1201 by various different methods. For example, the method may be such that the access authorization control server application is a web application and provides a screen on an web browser of the client device 101. When a command is entered on the screen of the web browser of the client device 101, the command can be transferred to the access authorization control server 1201.

In addition, the access authorization control server 1201 includes a file access authorization management table 1600 shown in FIG. 16. In the file access authorization management table 1600, document identifiers 1601 are associated with information 1602 that indicates the reservation printing designation that is set to a file identified by each document identifier 1601.

FIG. 16 is a diagram that illustrates an example of the file access authorization management table 1600 according to the second embodiment.

The file access authorization management table 1600 is stored in the hard disk of the access authorization control server 1201.

Referring back to the flow chart shown in FIG. 14, when it is determined by the file access authorization control server application that any command is received in step S403, then in step S404, the file access authorization control server application confirms whether the user identifier 1502 that is included in the received command is an identifier that is previously authorized. Then, when it is determined that the user identifier 1502 included in the received command is not an authorized identifier, then in step S407, the file access authorization control server application recognizes the access as an unauthorized access and ignores the received command. Then, the processing returns to step S403.

On the other hand, if it is determined that the user identifier 1502 is an authorized identifier in step S404, the file access authorization control server application checks if the request identifier 1503 in the received command is the "document identifier adding request" in step S405.

Then, in step S405, if the file access authorization control server application determines that the request identifier 1503 in the received command is the "document identifier adding request", the processing advances to step S406.

In step S406, the file access authorization control server application adds and registers the document identifier 1504 of the received command to the file access authorization management table 1600 (FIG. 16) stored in the hard disk of the access authorization control server 1201. Then, the processing returns to step S403.

On the other hand, if the file access authorization control server application determines that the request identifier 1503 in the received command is not the "document identifier adding request" in step S405, the processing advances to step S408.

In step S408, the file access authorization control server application checks if the request identifier 1503 in the received command is the "reservation printing designation adding request" or the "reservation printing designation deleting request". Then, if the file access authorization control server application determines that the request identifier 1503 in the received command is the "reservation printing designation adding request" or the "reservation printing designation deleting request", the processing advances to step S409.

In step S409, the file access authorization control server application checks if the document identifier 1504 that is designated in the received command is already registered to the file access authorization management table 1600. If the file access authorization control server application determines that the document identifier 1504 is not registered to the file access authorization management table 1600 yet, then in step S418, the file access authorization control server application recognizes that the access is an unauthorized access, and ignores the command. Then, the processing returns to step S403.

On the other hand, when the file access authorization control server application determines that the document identifier 1504 is already registered to the file access authorization management table 1600, the file access authorization control server application advances the processing to step S410.

In step S410, the file access authorization control server application checks if a change in the access authorization to the document related to the document identifier 1504 in the received command is permitted. Then, if the file access authorization control server application determines that a change in the access authorization is not permitted, the file access authorization control server application ignores the command in step S418 and then returns the processing to step S403.

On the other hand, in step S410, if the file access authorization control server application determines that a change in the access authorization is permitted, the file access authorization control server application advances the processing to step S411.

In step S411, the file access authorization control server application determines whether the request identifier 1503 in the received command is the "reservation printing designation adding request" or the "reservation printing designation deleting request". Then, if the file access authorization control server application determines that the request identifier 1503 is the "reservation printing designation adding request", the file access authorization control server application advances the processing to step S412.

In step S412, the file access authorization control server application sets the designated document identifier 1504 in the received command to the file access authorization management table 1600 so that the "reservation printing is designated" to the printer. Then, the processing returns to step S403.

On the other hand, in step S411, if the file access authorization control server application determines that the request identifier 1503 is not the "reservation printing designation adding request" (that is, the request identifier 1503 is the "reservation printing designation deleting request"), the file access authorization control server application advances the processing to step S413.

In step S413, the file access authorization control server application deletes the setting "reservation printing is designated" that is set to the document identifier 1504 in the received command from the file access authorization management table 1600. Then, the processing returns to step S403.

In addition, in step S408, if the file access authorization control server application determines that the request identifier 1503 is neither the "reservation printing designation adding request" nor the "reservation printing designation deleting request", the file access authorization control server application advances the processing to step S414.

In step S414, the file access authorization control server application checks if the request identifier 1503 in the received command is the "printing-permitted printer information acquiring request". Then, if the file access authorization control server application determines that the request identifier 1503 is not the "printing-permitted printer information acquiring request", the file access authorization control server application returns the processing to step S403.

On the other hand, in step S414, if the file access authorization control server application determines that the request identifier 1503 is the "printing-permitted printer information acquiring request", the file access authorization control server application advances the processing to step S415.

In step S415, the file access authorization control server application checks if the designated document identifier 1504 in the received command is registered to the file access authorization management table 1600. If the file access authorization control server application determines that the document identifier 1504 is not registered to the file access authorization management table 1600 yet, then in step S416, the file access authorization control server application notifies the client device 101 that the file access authorization control server application does not have information related to the document identifier 1504.

On the other hand, in step S415, if the file access authorization control server application determines that the designated document identifier 1504 in the received command is registered to the file access authorization management table 1600, the file access authorization control server application advances the processing to step S417.

In step S417, the file access authorization control server application retrieves the reservation printing designation 1602 that is associated with the document identifier 1504 in the received command from the file access authorization management table 1600. Then, the file access authorization control server application sends the retrieved reservation printing designation 1602 to the client device 101. Then, the processing returns to step S403.

An operation for file printing processing according to the second embodiment (an operation of the print application 301 for controlling whether the file 400 on the client device 101 is printed/not printed according to the reservation printing method) is described below with reference to FIG. 17 and FIG. 18.

Note that the operation when the printer driver is installed on the client device 101 is similar to the processing shown in FIG. 6 in the first embodiment.

Figure 17:
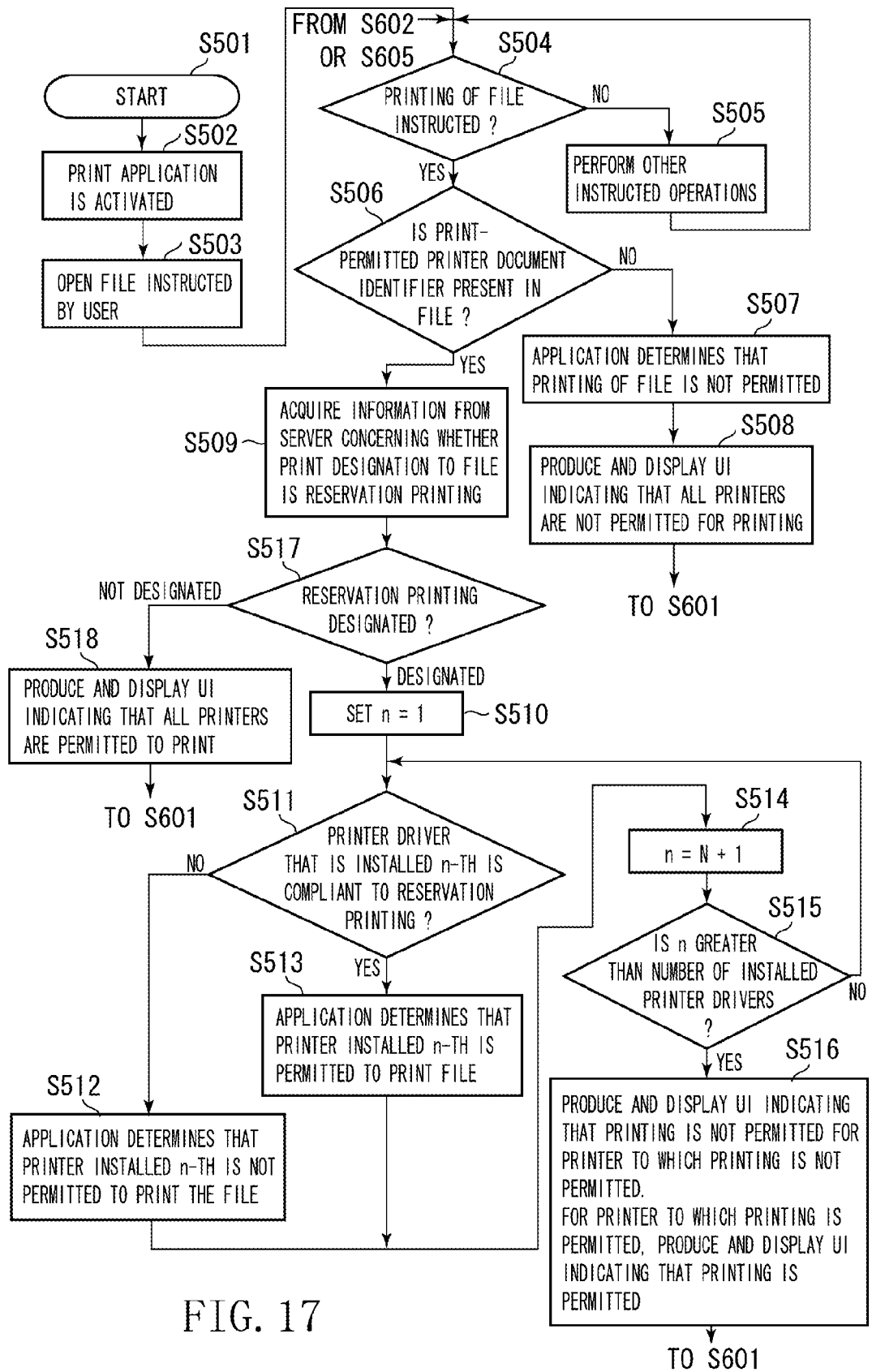
FIG. 17 is a flow chart that illustrates an example of a fourth procedure for control processing according to the second embodiment.
Figure 18:
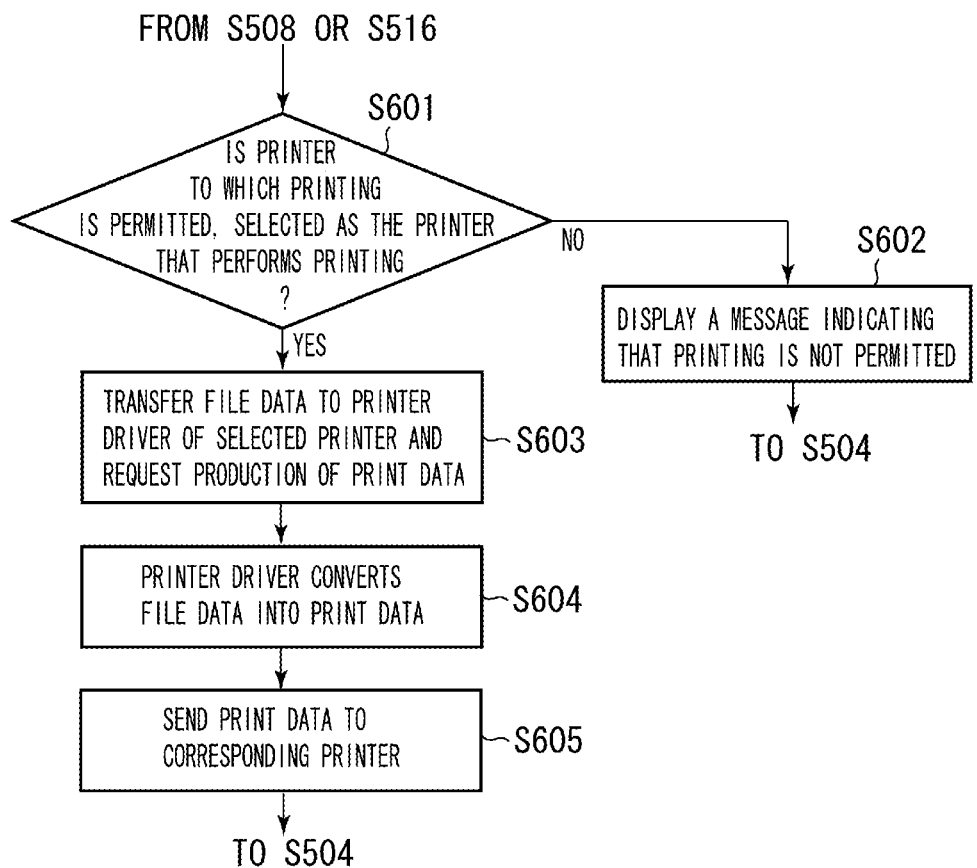
FIG. 18 is a flow chart that illustrates an example of the fourth procedure for control processing according to the second embodiment.

FIG. 17 and FIG. 18 are flow charts that illustrate an example of a fourth procedure for control processing according to the second embodiment, and correspond to the operation for file printing processing according to the second embodiment. Note that the processing shown in the flow charts is the processing by the print application 301 of the client device 101 and is implemented in a manner such that the CPU 11 of the client device 101 reads a program stored in the hard disk 13 to the RAM 12 so as to execute the program.

When an instruction for activating the print application 301 is input via the user command input device 15, the processing in the flow chart starts in step S501.

Then, in step S502, the CPU 11 activates the print application 301. After that, the print application 301 that is executed by the CPU 11 stays resident on the RAM 12 so as to monitor a print instruction for a file.

When an instruction for opening the file is issued via the user command input device 15, then in step S503, the print application 301 opens the instructed file.

Then, in step S504, the print application 301 checks if printing of the opened file is instructed via the user command input device 15. Then, if it is determined that the input instruction is an instruction other than the instruction for printing, the processing advances to step S505. Then, in step S505, the print application 301 causes the instructed operation to be executed, and then returns the processing to step S504.

On the other hand, in step S504, if the print application 301 determines that printing of the opened file is instructed via the user command input device 15, the processing advances to step S506. In step S506, the print application 301 checks if the document identifier 1301 (FIG. 13) is present in the opened file that is instructed to be printed.

Figure 19:
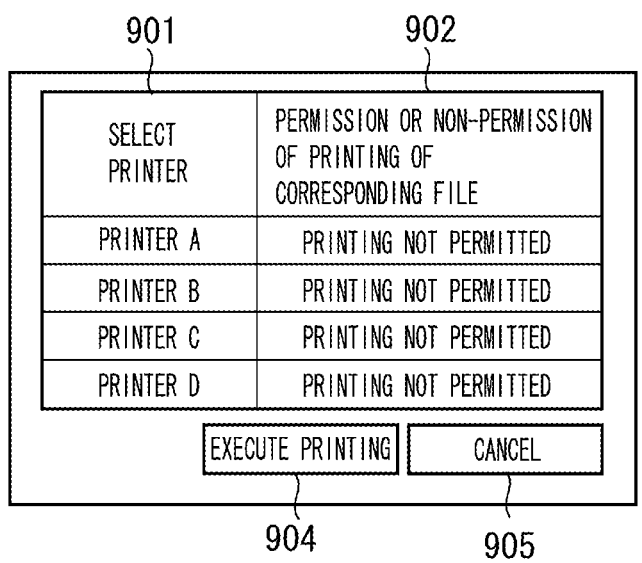
FIG. 19 is a diagram that illustrates an example of a UI indicating that all the printers are not permitted for printing, which is displayed in step S508 in FIG. 17.

Then, in step S506, if the print application 301 determines that the document identifier 1301 is not present in the opened file that is instructed to be printed, the processing advances to step S507. Then, in step S507, the print application 301 determines that the opened file that is instructed to be printed is not permitted to be printed. Then, in step S508, the print application 301 produces a UI indicating that all the printers (the printers 102 through 105 shown in FIG. 12) connected to the client device 101 are not permitted for printing, and performs control so that the UI is displayed by the UI display device 16. FIG. 19 illustrates the UI. Then, the print application 301 advances the processing to step S601 in FIG. 18.

On the other hand, in step S506, if the print application 301 determines that the document identifier 1301 is present in the opened file that is instructed to be printed, the print application 301 advances the processing to step S509. Then, in step S509, the print application 301 requests the information that indicates whether the printing method associated with the document identifier 1301 is the reservation printing to the access authorization control server 1201 so as to acquire the information. More specifically, the print application 301 produces the command 1500 as shown in FIG. 15. In this case, the user identifier 1502 is used as a user ID of the user who operates the client device 101. In addition, the request identifier 1503 is used as an identifier that indicates the "printing-permitted printer information acquiring request". In addition, the document identifier 1504 is used as the document identifier 1301 described above. Then, the print application 301 sends the produced command to the access authorization control server 1201, and then acquires information returned from the access authorization control server 1201 (that is, the information that is sent in step S416 or step S417 in FIG. 14). Note that if the access authorization control server 1201 does not return any information within a specific period of time, the print application 301 performs control so that a message to that effect is displayed by the UI display device 16. Then, the processing returns to step S504.

Then, in step S517, the print application 301 determines whether the information sent from the access authorization control server 1201 indicates the setting "reservation printing is designated" or the setting "reservation printing is not designated". When the information sent from the access authorization control server 1201 indicates the setting "reservation printing is not designated", the print application 301 advances the processing to step S518.

In step S518, the print application 301 performs control so that a UI that indicates that all the printers (the printers 102 through 105 shown in FIG. 12) connected to the client device 101 are permitted for printing is displayed by the UI display device 16. On the other hand, in step S517, if the information sent from the access authorization control server 1201 indicates the setting "reservation printing is designated", the print application 301 advances the processing to step S510.

Then, in step S510, the print application 301 sets "1" to a variable n that is stored on the RAM 12. The variable n is a counter for counting the number of the printer drivers.

Then, in step S511, the print application 301 checks if the printer corresponding to the printer driver that is installed n-this compliant to the reservation printing. Then, if the print application 301 determines that the printer corresponding to the printer driver that is installed n-th is compliant to the reservation printing, the print application 301 advances the processing to step S513.

Then in step S513, the print application 301 determines that the printer corresponding to the printer driver that is installed n-th is permitted for printing and then stores a content to that effect on the RAM 12. Then, the processing advances to step S514.

On the other hand, in step S511, if the print application 301 determines that the printer corresponding to the printer driver that is installed n-th is not compliant to the reservation printing, the print application 301 advances the processing to step S512.

Then, in step S512, the print application 301 determines that the printer corresponding to the printer driver that is installed n-th is not permitted for printing and then stores a content to that effect on the RAM 12. Then, the processing advances to step S514.

Then, in step S514, the print application 301 increments the variable n that is a counter for the printer drivers, which is stored on the RAM 12, by 1. Then, the processing advances to step S515.

Then, in step S515, the print application 301 compares the variable n with the number of the installed printer drivers. By the comparison, the print application 301 determines whether the determination in step S511 has been performed with respect to all the printer drivers. Then, if it is determined that the printer to be determined still remains (that is, when n≤the number of the installed printer drivers), the print application 301 returns the processing to step S511 and makes the determination with respect to the next printer driver.

On the other hand, in step S515, if the print application 301 determines that no printer to be determined remains (that is, n>the number of installed printer drivers), the print application 301 advances the processing to step S516.

In step S516, the print application 301 produces a UI indicating that printing is not permitted for the printer that is determined that printing is not permitted, and for the printer that is determined that printing is permitted, produces a UI indicating that printing is permitted (as shown in FIG. 9). Then, the print application 301 performs control so that the UI is displayed by the UI display device 16, and then advances the processing to step S601 in FIG. 18.

FIG. 19 is a diagram that illustrates an example of a UI that indicates that all the printers are not permitted for printing, which is displayed in step S508 in FIG. 17. In FIG. 19, similar components as those in FIG. 9 are denoted by the same reference numerals.

The flow chart shown in FIG. 18 is described below.

When the printer that performs printing is selected and the printing execution button 904 is pressed via the UI shown in FIG. 9 or FIG. 19 using the user command input device 15, the print application 301 advances the processing to step S601.

In step S601, the print application 301 checks if the printer that is permitted for printing is selected as the printer that performs printing. If it is determined that the printer that is not permitted for printing (that is, printing-nonpermitted printer) is selected, the print application 301 advances the processing to step S602. In step S602, the print application 301 displays a message indicating that printing is not permitted (the message 1101 shown in FIG. 11) on the UI display device 16. Then, when the "OK" button 1102 is pressed via the user command input device 15, the processing returns to step S504 in FIG. 17.

On the other hand, in step S601, if the print application 301 determines that the printer that is permitted for printing is selected as the printer that performs printing, the print application 301 shifts the processing to step S603.

Then, in step S603, the print application 301 transfers data of the file that is instructed to be printed to the printer driver that corresponds to the selected printer so as to request print data to be produced.

Then, in step S604, the printer driver (executed by the CPU 11) that is requested to produce the print data converts the data of the file that is instructed to be printed into the print data that the printer corresponding to the printer deriver can rasterize into an image. Then, in step S605, the printer driver sends the converted print data to the corresponding printer via the communication device 17. Note that in this case, print setting information including the designation for the reservation printing is sent as well. Then, the processing returns to step S504.

As described above, the client device 101, when receiving a request for printing data to be printed, acquires a security attribute of the data to be printed by communicating with the access authorization control server 1201. Then, the client device 101 performs control so that if the data to be printed is set as outputable only by the reservation printing, the reservation printing is automatically performed by the printer compliant to the reservation printing. With this configuration, an information leakage occurring when a printing person forgets to pick up a print product or when another person carries away a print product by mistake in printing highly confidential data can be suppressed.

Note that in each of the above-described embodiments, a description has been made as to the configuration such that if data to be printed is set to be outputable only by the reservation printing, the reservation printing-compliant printer performs the reservation printing. However, the configuration can be arranged such that a pull printing-compliant printer performs pull printing, instead of the reservation printing.

Here, the pull printing is a printing method in which when a print instruction is sent from the client device to the printer, print data itself is not sent and is stored in the client device or in the server. Then, only after the user issues the print instruction via the operation unit 29 of the printer, the printer acquires the print data from the client device or the server so as to print out the print data. Note that in this case, the printer requests the user to receive a user authorization or to enter a password that is set for each print information so as to inhibit printing of print data authorized to another person.

In the pull printing, just as in the case of the reservation printing described above, a printing person instructs printing in front of the printer. Accordingly, an information leakage occurring when another person looks at or reads a print product before the printing person picks up the print product, when the printing person forgets to pick up the print product, or when another person carries away the print product by mistake can be suppressed.

Note that the present invention can be applied to any kind of printing method, in addition to the reservation printing and the pull printing, as long as the printing method is such that a document is printed out only after the user instructs printing via the operation unit 29 of the printer. Such a printing method is collectively referred to as confidential printing.

In addition, the configuration can be arranged such that while the confidential printing such as the reservation printing and the pull printing is being performed, when the printer determines the existence of the user and if the user cannot be determined to be in front of the printer without picking up a confidential print product, a warning sound is issued or the print processing is suspended. Thus, the leakage of confidential information can be more surely suppressed.

Note that the processing of authorization that the user performs in front of the printer can be performed by entering a user ID and a password or can be performed by using a magnetic card and an IC card (read by contact-reading or noncontact-reading). In addition, the authorization processing can be performed by a biometric identity verification. For example, the authorization can be an authorization by fingerprints, an authorization by a pattern of finger veins, and an authorization by a handprint and a size and shape of a hand. In addition, the authorization can be an authorization by a pattern of a retina appearing on eyegrounds, an authorization by a pattern of an iris of an eye, an authorization by an outline of a face and positions of the eyes and the nose, an authorization by a speech waveform and a speed of speech, and an authorization by a shape of a signature, a stroke order in writing, a feature of a writing manner, and a handwriting pressure.

An exemplary embodiment of the present invention can be implemented in a system, an apparatus, a method, a program, or a storage medium. More specifically, the present invention can be applied to a system that includes a plurality of devices or can be applied to an apparatus that includes one device only.

Hereinbelow, with reference to a memory map shown in FIG. 20 and FIG. 21, a configuration of the memory map of a storage medium that stores various kinds of data processing programs that an information processing apparatus (image processing apparatus) according to an exemplary embodiment can read is described.

Figure 20:
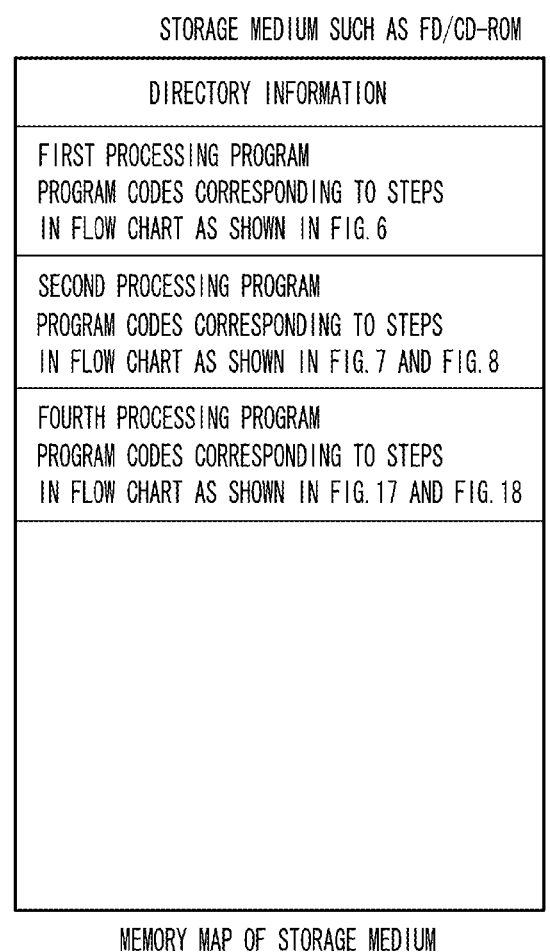
FIG. 20 is a diagram that illustrates a memory map of a storage medium (recording medium) that stores various kinds of data processing programs that a client device shown in FIG. 1 or FIG. 12 can read.

FIG. 20 is a diagram that illustrates a memory map of a storage medium (recording medium) that stores various kinds of data processing programs that the client device 101 shown in FIG. 1 or FIG. 12 can read.

Figure 21:
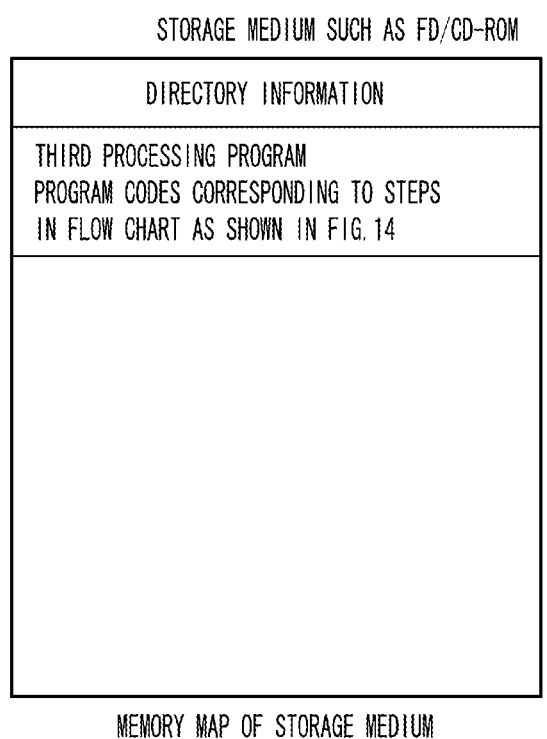
FIG. 21 is a diagram that illustrates a memory map of a storage medium (recording medium) that stores various kinds of data processing programs that an access authorization control server shown in FIG. 12 can read.

FIG. 21 is a diagram that illustrates a memory map of a storage medium (recording medium) that stores various kinds of data processing programs that the access authorization control server 1201 shown in FIG. 12 can read.

Note that although not shown in FIG. 20 and FIG. 21, in some cases, information for managing a group of programs stored in a storage medium, such as version information and information as to a producer of the program, for example, is stored, and also the information that depends on an operating system (OS) of a device that reads the program, for example, an icon for identifying and displaying the program, is stored.

In addition, data that is subordinate to the various kinds of programs is managed in the above directory. In addition, a program for installing the various kinds of programs on a computer or a program for decompressing the program when the program to be installed is a compressed program is stored in some cases.

In addition, the functions of the embodiments shown in FIG. 6, FIG. 7, FIG. 8, FIG. 14, FIG. 17, and FIG. 18 can be executed by a host computer using a program that is externally installed. In this case, the present invention can be applied to a case where a group of information including programs is supplied to an apparatus from a storage medium such as a CD-ROM, a flash memory, and a flexible disk (FD), or from an external storage medium via a network.

The present invention can also be achieved by providing a system or a device with a storage medium which stores program code of software implementing the functions of the embodiments and by reading and executing the program code stored in the storage medium with a computer of the system or the device (a CPU or an MPU).

In this case, the program code itself, which is read from the storage medium, implements the functions of the present invention mentioned above, and accordingly, the storage medium storing the program code constitutes the present invention.

Accordingly, a form of the program may be configured by the form such as object code, program code executed by an interpreter, and script data supplied to an OS.

As the storage medium for supplying such program code, a flexible disk, a hard disk, an optical disk, a magneto-optical disk, an MO, a CD-ROM, a CD-R, a CD-RW, a magnetic tape, a nonvolatile memory card, a ROM, and a DVD, for example, can be used.

In this case, the program code itself, which is read from the storage medium, implements the functions of the embodiments mentioned above, and accordingly, the storage medium storing the program code constitutes the present invention.

The above program can also be supplied by connecting to a web site on the Internet by using a browser of a client computer and by downloading the program according to the present invention itself from the web site to a storage medium such as a hard disk. In addition, the above program can also be supplied by downloading a compressed file that includes an automatic installation function from the web site to a storage medium such as a hard disk. The functions of the above-described embodiments can also be implemented by dividing the program code into a plurality of files and downloading each divided file from a different web site. That is, a WWW server and an FTP server that allow a plurality of users to download the program file for implementing the functional processing of the present invention configure the present invention.

In addition, the above program can also be supplied by distributing a storage medium such as a CD-ROM and the like which stores the program according to the present invention after an encryption thereof, by allowing the user who is qualified for a prescribed condition to download a key information for decoding the encryption from the web site via the Internet, and by executing and installing in the computer the encrypted program code by using the key information.

In addition, the functions according to the embodiments described above are implemented not only by executing the program code read by the computer, but also implemented by the processing in which an operating system (OS) or the like carries out a part of or the whole of the actual processing based on an instruction given by the program code.

Further, in another exemplary embodiment of the present invention, after the program code read from the storage medium is written in memory provided in a function expansion board inserted in the computer or a function expansion unit connected to the computer, a CPU and the like provided in the function expansion board or the function expansion unit carries out a part of or the whole of the processing to implement the functions of the embodiments as described above.

In addition, the present invention can be applied to a system that includes a plurality of devices and also to an apparatus that includes one device. In addition, the present invention can be applied to a case where an aspect of the present invention is achieved by supplying a program to the system or the apparatus. In this case, the system or the apparatus can utilize the advantageous effect of the present invention in a manner such that a storage medium storing a program represented by software for achieving the present invention is read onto the system or the apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-310794 filed Oct. 26, 2005, which is hereby incorporated by reference herein in its entirety.

What is claimed is:

1. An apparatus that is capable of communicating with a printing device, the printing device comprising an operation unit configured to receive a user input and being capable of performing a printing function in which the printing device prints data after the user input is received by the operation unit, the apparatus comprising:
   a determination unit configured to determine whether data to be printed has an attribute indicating that the printing function is to be performed to print the data; and
   a control unit configured to, if it is determined by the determination unit that the data to be printed has the attribute, notify a user of information for identifying a plurality of printing devices including a printing device that has the printing function and a printing device that does not have the printing function together with information indicating whether or not each of the plurality of printing devices is capable of performing the printing function, enables the user to select one of the plurality of printing devices, control the printing device selected by the user to print the data in the printing function if the printing device that has the printing function is selected by the user and notify the user that printing of the data by the printing device selected by the user is not permitted, if the printing device that does not have the printing function is selected by the user.

2. The apparatus according to claim 1, wherein, when a printing device that does not have the printing function is selected by the user, the control unit does not permit printing of the data to be printed.

3. The apparatus according to claim 1, further comprising an acquiring unit configured to acquire, from a printing device, information indicating whether the printing device has the printing function.

4. The apparatus according to claim 1, wherein the printing function is a reservation printing function in which the printing device waits for the operation unit of the printing device to receive a user ID, a password, authorization information in a magnetic card, authorization information in a IC card, or a biometric identity as the user input, and prints the data after receiving the user input via the operation unit of the printing device.

5. The apparatus according to claim 1, wherein, if it is determined by the determination unit that the data to be printed has the attribute indicating that the printing function is to be performed to print the data, the control unit sends a designation of the printing function, to the printing device selected by the selecting unit.

6. The apparatus according to claim 1, wherein in the printing function, the printing device receives the data to be printed from the apparatus, stores the received data without printing out the data, and prints out the stored data only after the user input is received by the operation unit of the printing device.

7. The apparatus according to claim 1, wherein in the printing function, the printing device acquires the data to be printed from an external apparatus only after the user input is received by the operation unit of the printing device, and prints the acquired data.

8. The apparatus according to claim 1, wherein attribute information for identifying the attribute indicating that the printing function is to be performed to print the data is added to the data to be printed, and
   wherein the determination unit, when receiving a request for printing the data to be printed, reads the attribute information added to the data to be printed to determine whether the data to be printed has the attribute indicating that the print function is to be performed to print the data.

9. The apparatus according to claim 1, wherein the apparatus is capable of communicating with a server device that stores attribute information for identifying the attribute indicating that the printing function is to be performed to print the data, and wherein the determination unit, when receiving a request for printing the data to be printed, acquires the attribute information from the server device to determine whether the data to be printed has the attribute indicating that the print function is to be performed to print the data.

10. A method for use with an apparatus that is capable of communicating with a printing device, the printing device comprising an operation unit configured to receive a user input and being capable of performing a printing function in which the printing device prints data after the user input is received by the operation unit, the method comprising:

determining whether data to be printed has an attribute indicating that the printing function is to be performed to print the data;

if it is determined that the data to be printed has the attribute indicating that the printing function is performed to print the data, notifying a user of information for identifying a plurality of printing devices including a printing device that has the printing function and a printing device that does not have the printing function together with information indicating whether or not each of the plurality of printing devices is capable of performing the printing function;

enabling the user to select one of the plurality of printing devices;

controlling the selected printing device to print the data in the printing function if the printing device that has the printing function is selected by the user; and notifying the user that printing of the data by the printing device selected by the user is not permitted, if the printing device that does not have the printing function is selected by the user.

11. The method according to claim 10, wherein in the printing function, the printing device receives the data to be printed from the apparatus, stores the received data without printing the data and prints the stored data only after the user input is received via the operation unit of the printing device.

12. The method according to claim 10, wherein in the printing function, the printing device acquires the data to be printed from the apparatus only after the user input is received via the operation unit of the printing device, and prints the acquired data.

13. A non-transitory computer-readable medium storing instructions which, when executed by an apparatus that is capable of communicating with a printing device, the printing device comprising an operation unit configured to receive a user input and being capable of performing a printing function in which the printing device prints data after the user input is received by the operation unit, causes the apparatus to perform operations comprising:

determining whether data to be printer has an attribute indicating that the printing function is performed to print the data; and if it is determined that the data to be printed has the attribute indicating that the printing function is performed to print the data, notifying a user of information for identifying a plurality of printing devices including a printing device that has the printing function and a printing device that does not have the printing function together with information indicating whether or not each of the plurality of printing devices is capable of performing the printing function;

enabling the user to select one of the plurality of printing devices;

controlling the selected printing device to print the data in the printing function if the printing device that has the printing function is selected by the user; and notifying the user that printing of the data by the printing device selected by the user is not permitted, if the printing device that does not have the printing function is selected by the user.

14. The computer-readable medium according to claim 13, wherein in the printing function, the printing device receives the data to be printed from the apparatus, stores the received data without printing out the data, and prints out the stored data only after the user input is received via the operation unit of the printing device.

15. The computer-readable medium according to claim 13, wherein in the printing function, the printing device acquires print data to be printed from an external apparatus only after the user input is received via the operation unit of the printing device, and prints the acquired data.

* * * * *